United States Patent
Ferguson et al.

(10) Patent No.: US 6,820,741 B2
(45) Date of Patent: Nov. 23, 2004

(54) DISC MEDIA AND STORAGE AND RETRIEVAL SYSTEM

(75) Inventors: Gary William Ferguson, Burnaby (CA); Jayson Darek Eppler, Vancouver (CA)

(73) Assignee: G6 Science Corp. (CA)

( * ) Notice: Subject to any disclaimer, the term of this patent is extended or adjusted under 35 U.S.C. 154(b) by 149 days.

(21) Appl. No.: 10/339,266

(22) Filed: Jan. 9, 2003

(65) Prior Publication Data

US 2004/0134806 A1 Jul. 15, 2004

(51) Int. Cl.⁷ .............................................. B65D 85/57
(52) U.S. Cl. ....................... 206/310; 206/493; 312/9.41
(58) Field of Search .............................. 206/308.1, 310, 206/493; 414/935; 118/500; 407/117; 312/9.9, 9.41, 9.42, 9.45, 9.47

(56) References Cited

U.S. PATENT DOCUMENTS

| | | |
|---|---|---|
| 1,525,745 A | 2/1925 | Keefer |
| 2,106,726 A | 2/1938 | Draeger |
| 3,463,536 A | 8/1969 | Updegraff |
| D258,203 S | 2/1981 | Elzea |
| 4,253,571 A | 3/1981 | Keohan |
| 4,316,281 A | 2/1982 | Prusak |
| 4,457,429 A | 7/1984 | Huber |
| 4,502,598 A | 3/1985 | Wartenbergh |
| 4,512,474 A | 4/1985 | Harding |
| 4,516,678 A | 5/1985 | Fotiadis |
| 4,577,756 A | 3/1986 | Hennessy |
| 4,700,839 A | 10/1987 | Fujii |
| 4,782,645 A | 11/1988 | Tajima et al. |
| 4,848,571 A | 7/1989 | Fullar |
| 4,998,618 A | 3/1991 | Borgions |
| 5,176,250 A | 1/1993 | Cheng |
| 5,195,794 A | 3/1993 | Hummel |
| 5,235,579 A | 8/1993 | Ross |
| 5,363,962 A | 11/1994 | Toral |
| 5,482,428 A | 1/1996 | Kuhlman |
| 5,548,454 A | 8/1996 | Kawakubo et al. |
| 5,573,120 A | 11/1996 | Kaufman |
| 5,633,842 A | 5/1997 | Nishida |
| 5,669,494 A | 9/1997 | Geffen |
| 5,697,684 A * | 12/1997 | Gyovai ...................... 312/9.42 |
| 5,855,273 A | 1/1999 | Grobecker |
| 5,887,714 A | 3/1999 | Yeo |
| 6,111,848 A | 8/2000 | Hui |
| 6,112,894 A | 9/2000 | Kikuchi |
| 6,119,872 A | 9/2000 | Flores, Jr. et al. |
| 6,213,312 B1 | 4/2001 | Thielsen |
| 6,238,022 B1 | 5/2001 | Chan |
| 6,283,280 B1 * | 9/2001 | Wong et al. ............. 206/308.1 |
| 6,296,114 B1 | 10/2001 | Bubb |
| 6,333,911 B1 | 12/2001 | Sato |
| 6,435,343 B1 | 8/2002 | Wu et al. |

FOREIGN PATENT DOCUMENTS

EP 1 168 349 A2 1/2002

* cited by examiner

*Primary Examiner*—Jacob K. Ackun, Jr.
(74) *Attorney, Agent, or Firm*—Trexler, Bushnell, Giangiorgi, Blackstone & Marr, Ltd.

(57) ABSTRACT

The present invention is a disc media storage and retrieval system for safely and efficiently storing and conveniently retrieving specific disc media from a plurality of disc media stacked on a central column or spindle. Modified disc media are rotationally aligned on the spindle using corresponding alignment protrusion(s) formed on the spindle and notch(es) on the inner chuck hole of the disc. Accordingly, disc media is further modified with the addition of indexing notches on the outer circumference of the disk, such that each disc within the system is provided a unique notched-index. The aligned stack is protected by a cover member that forms a disc lifting device. A disc of interest is indexed and retrieved from the stack by rotating the cover member relative to the disc stack thereby aligning the disc notch-index with the lifting device. When the cover member is raised, the lifting device separates the stack at the disc of interest. These innovations and modifications to the disc media provide improvements in disc storage and retrieval over existing spindle-type disc media storage systems.

21 Claims, 9 Drawing Sheets

DISC MEDIA AND STORAGE AND RETRIEVAL SYSTEM

BACKGROUND OF THE INVENTION

The present invention relates to a disc media storage and retrieval system and, in particular, to a disc media storage and retrieval system for efficiently storing and conveniently retrieving disc media, for example, a plurality of optical discs such as CD-R (compact disc recordable), CD-RW (compact disc rewritable), and DVD.

Optical disc media offers an attractive combination of storage capacity and convenience at a relatively low manufacturing and media cost. Accordingly, various forms of CD and DVD have gained widespread market acceptance. In order to store data, the user purchases recordable media such as CD-R, CD-RW or its DVD equivalent.

Optical disc media may be damaged by spillage, abrasion or their data surface(s) may be otherwise compromised. Therefore it is generally desirable to protect disc media in some form of sleeve or case while not in use. In some instances, the disc's original packaging provides a suitable container(s). It may therefore be advantageous to distribute recordable disc media in packaging that is suitable for long term storage Recordable disc media are commonly distributed as a plurality of disc media secured by a central spindle and covered with a protective case. While this type of spindle packaging provides relatively efficient storage and reasonable protection, locating a specific disc among a stack of media, may be both arduous and time consuming. Typically the user must remove and examine several discs before locating and accessing the desired disc. Therefore, conventional spindle-type packaging is not particularly well suited for both media storage and convenient retrieval.

In addition to spindle-type packaging, there are a variety of other storage and protection devices available for disc media such as paper sleeves, binders, jewel cases, and compartment-type systems, etc. However, these devices typically require more space to store and display disc media.

In the case of both the jewel-case systems' and the compartment-type systems, particular discs are located by either visually searching the labeled array of discs or by some method of indexing where the user constructs a database or list to reference disc media. A disadvantage of using a recorded index list is that to function effectively the user typically must assume the burden of returning each disc to its appropriate position after each use.

It would therefore be advantageous to incorporate a means of convenient disc retrieval into a spindle-type storage system such that the means of indexing or otherwise accessing disc media does not require the user to maintain a particular ordering of discs.

Thus, it is an object of the present invention to provide a disc media storage and retrieval system that provides reasonable protection for disc media, allows the storage of a plurality of disc media in a relatively compact space and which provides a more effective means of disc location and retrieval. In addition, certain embodiments of the present invention are suitable for packaging, display, sale, storage and transport of disc media.

The objects of the present invention are achieved by a disc media storage and retrieval system having the features specified in the defining part of the claims. Various embodiments and configurations are further described and evolved from the figures, description and discussion.

SUMMARY OF THE INVENTION

In accordance with the foregoing, the present invention is a disc media storage and retrieval system for safely, efficiently and conveniently storing and accessing CDs or DVDs. Accordingly, each disc within the system is provided with at least two alignment points, such as a central protrusion and a peripheral notch. Initial alignment for example may be accomplished by providing one or more protrusions on the central spindle and providing mating notches on the center, non-data area of the disc media. The system preferably establishes that discs may only be stacked onto the central column in one way. Further, it may be advantageous to use two central alignment marks or otherwise design the mating of disc to central spindle so that disk media may only be stacked in one direction, for example, face up.

Indexing of disc media may be accomplished by providing each disc within the stack a unique index notch(es). In the preferred embodiment, a disc lifting device is formed within the protective cover. A disc of interest is retrieved from the stack by rotating the cover relative to the disc stack so that the disc lifting device aligns with the indexing notch(es) of the disc of interest. Then when the cover member is raised, the disc stack is separated at the disc of interest, providing direct access to the disc of interest. This modification to both the disc media and stacking members provides improved disc retrieval compared to existing spindle-type disc media storage systems. Alternatively, the disc lifting devices may comprise a portion of an electro-mechanical system to achieve the same goals.

Notching of disc media may be achieved either during their manufacture or following their purchase by employing a suitable disc notching tool. The tool should cut both the disc alignment notch and the outer disc notches and allow for the setting of different disc indexing angles. The notching tool should support the disc during notching so that the disc is not damaged by deformation. Various embodiments may achieve this effect by shearing, cutting, grinding or otherwise removing material from the disc edges.

BRIEF DESCRIPTION OF PRIOR ART

U.S. Pat. No. 3,463,536 to Updegraff et al. entitled 'Container Handle' discusses a lifting device for bottles that employs inwardly projecting radial fingers to grip the bottle.

U.S. Pat. No. 4,316,281 to Prusak entitled 'Spacer for Stacked Recorded Discs' discusses a spacer plate used to separate disc media stacked on a spindle such that their recording surfaces do not make contact.

U.S. Pat. No. 4,516,678 to Fotiadis et al. entitled 'Floppy Disk Canister' discusses a spindle type package with protective cover for storing magnetic floppy discs during manufacture. This package includes a latching mechanism for securing the cover to the spindle base.

U.S. Pat. No. 4,700,839 to Fujii entitled 'Package Including Disk-Form Magnetic Recording Mediums' discusses a spindle type package with protective cover for storing magnetic disc media.

U.S. Pat. No. 4,998,618 to Borgions entitled 'Storage Case for Optical Discs' discusses a storage case for a plurality of compact discs that are individually held in swing-out tray holders. This device is intended to work with a commercially available compact disc changer.

U.S. Pat. No. 5,176,250 to Cheng entitled 'Handy Disk Storage Box' discusses a container that stores disc media that are individually held in flat disc holders. This container is suitable for storing and transporting discs.

U.S. Pat. No. 5,195,794 to Hummel, Jr. et al. entitled 'Compact Disk Lifting Device' discusses a plunger operated device for lifting and releasing a single compact disc.

U.S. Pat. No. 5,235,579 to Ross entitled 'Compact Disc Storage Retrieval and Loading Device' discusses a remote controlled compact disc loader that incorporates a disc carousel and supports a compact disc player.

U.S. Pat. No. 5,573,120 to Kaufman entitled 'Storage Container for Compact Discs and the Like' discusses a jewel case for holding a single optical disc medium.

U.S. Pat. No. 5,669,494 to Geffen entitled 'Storage Carousel for Compact Disks and the Like' discusses a system for storing disc media contained within jewel cases.

U.S. Pat. No. 6,111,848 to Hui entitled 'Compact Disk Storage and Retrieval System' discusses a system for storing compact discs in jewel cases. This system allows the user to locate a particular disc by electronic addressing and an electromechanical disc ejection mechanism.

U.S. Pat. No. 6,112,894 to Kikuchi et al. entitled 'Disc Medium Accommodating Case' discusses a spindle type package with protective cover for storing disc media. This patent focuses on optical disc media such as CD-R and DVD disc media.

U.S. Pat. No. 6,238,022 to Chan entitled 'Disc Storage Container' discusses a system for storing disc media separated by rigid ribs and retrieved by mechanical indexing.

U.S. Pat. No. 6,296,114 to Bubb et al. entitled 'Package for Optical Disk Stack' discusses a spindle type package for storing optical disc media with the aim of minimal material and cost.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
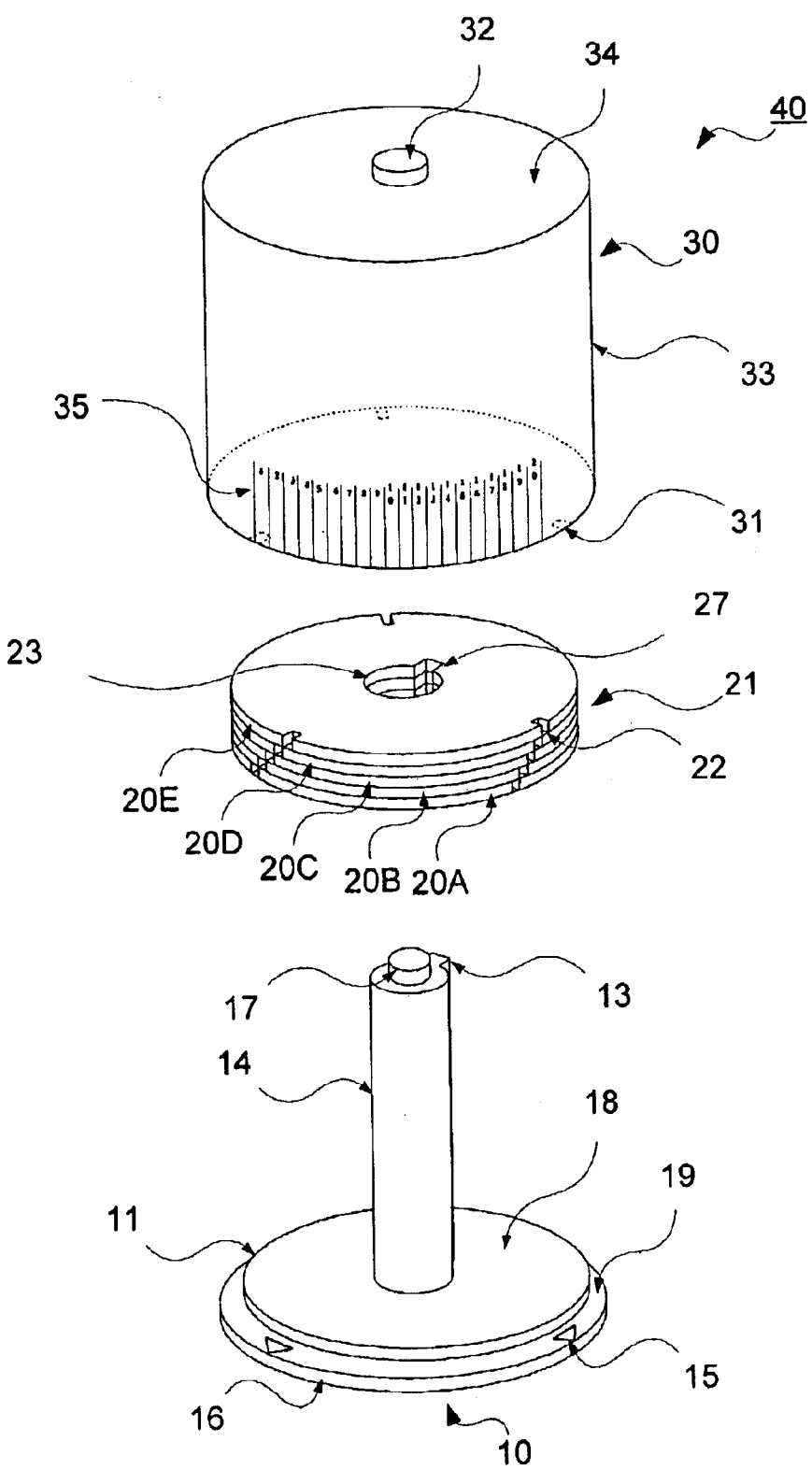
FIG. 1 is a perspective view showing the components of a preferred embodiment of the disc media storage and retrieval device and a set of disc media.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

FIG. 1 shows an embodiment of the present invention comprising a stacking column and base plate member 10, a protective cover member 30 and a stack 21 consisting of a set of modified disc media 20A, 20B, 20C, etc. The disc media 20A, 20B, 20C, etc. are threaded onto the stacking column 14 through a chucking hole 23, and are substantially aligned relative to the stacking column and base plate member 10 by means of a stacking column alignment-protrusion 13. The alignment-protrusion 13 protrudes radially outward from the stacking column 14 and fits in a disc alignment notch 27 of complimentary dimensions in the modified disc media 20. Alternatively, the stacking column 14 can contain a recess and the disc media 20A, 20B, 20C, etc., can contain a protrusion, or distinctive shapes can be used to constrain the disc media 20A, 20B, 20C, etc., on the stacking column 14.

The first modified disc medium 20A to be threaded onto the stacking column 14 sits lowest in the stack 21 of modified disc media 20A, 20B, 20C, etc., and comes to rest on the upper surface 18 of the upper base plate portion 11. Subsequent modified disc media 20B, 20C, etc., come to rest on the next lowest modified disc medium and are typically not separated by any spacer or the like. A set of such stacked modified disc media 20A, 20B, 20C, etc. form the disc stack 21.

The protective cover member 30 fits over the stacking column and base plate member 10 and disc stack 21 so that the stacking column cap 17 fits into the cover member hub 32 and the cover lower edge 37 contacts the upper surface 19 of the lower base plate portion 16.

Figure 2:
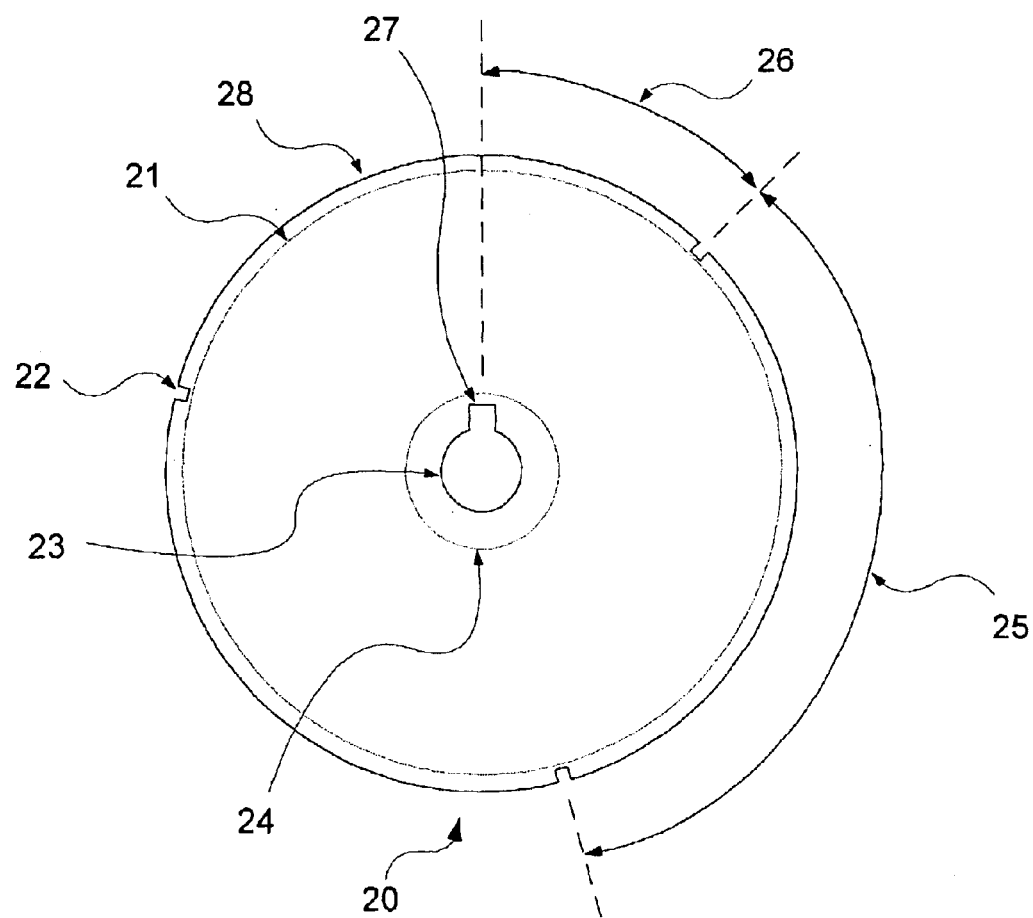
FIG. 2 is a top view of a modified disc.

As shown in FIG. 2, an exemplary modified disc medium 20 preferably comprises a thin circular disc with a concentric chucking hole 23, a disc alignment notch 27, a recordable surface bounded by an inner circumference 24 and an outer circumference 21 and a plurality of outer disc notches 22. The disc alignment notch 27 consists of a rectangular notch extending radially outward from the circumference of the chucking hole 23, preferably no further than the inner circumference of the recordable surface 24. Each outer disc notch 22 consists of a rectangular notch extending radially inward from the outer circumference of the disc medium, preferably no further than the outer circumference of the recordable surface 21. The outer disc notches 22 are spaced uniformly around the outer circumference of the disc medium 28 by an outer disc medium separation angle 25. Each modified disc medium 20 that forms part of a disc stack is assigned a unique index angle 26. The disc medium index angle 26 is the angle between the disc alignment notch 27 and the first clockwise located outer disc notch 22 and is set such that the difference between the index angles 26 for any two modified disc media 20A and 20B that forms part of a disc stack 21 is greater than some index increment angle. The index increment angle is the difference between the index angles 26 of any two modified disc media 20A and 20B with adjacent indices. Mathematically, the minimum index increment angle is $360/\text{nd}(\Delta C)$, where d is the diameter of the disc media and $\Delta C$ is the arc of the lifting tabs 31 as later defined.

Figure 3A:
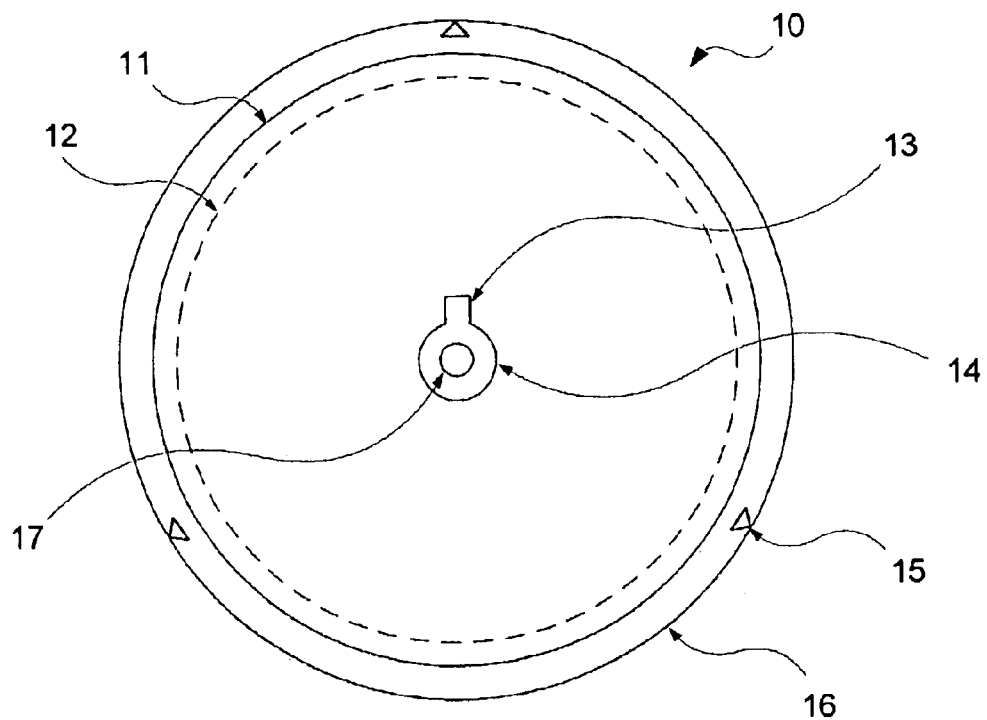
FIGS. 3A and 3B are side and top views of the stacking column and base plate member.
Figure 3B:
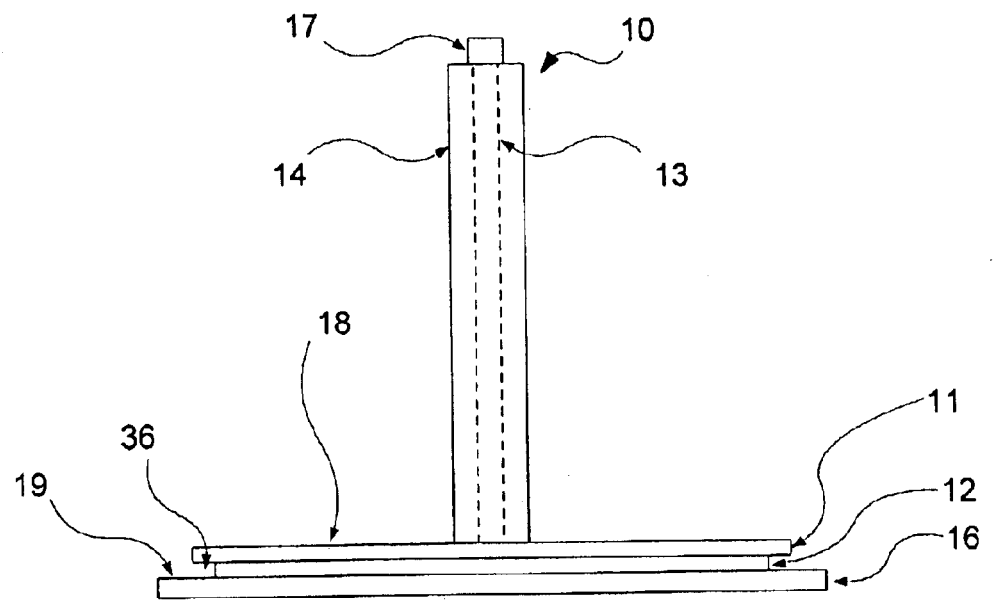

As shown in FIGS. 3A and 3B, the stacking column and base plate member 10 comprises a circular upper base plate portion 11 that has substantially the same diameter as the modified disc medium 20, a circular recess base plate portion 12 located immediately below the upper base plate portion 11 that has a diameter less than the upper base plate portion 11 and is at least as thick as a modified disc medium 20, a circular lower base plate portion 16 located immediately below the recess base plate portion 12 that has a diameter larger than upper base plate portion 11 and larger than the bottom diameter of the protective cover member 30, a cylindrical stacking column 14 with diameter slightly less than the modified disc medium chucking hole 23 diameter and taller than the height of the intended stack 21 of modified disc media 20, a short cylindrical stacking column cap 17, a rectangular stacking column alignment protrusion 13 slightly smaller than the disc alignment notch 27 and extending the length of the stacking column 14 and a plurality of base plate rotation reference marks 15 uniformly spaced around lower base plate portion 16, the number of which base plate rotation reference marks 15 is the same as the number of outer disc notches 22. The differences in diameters of circular upper base plate portion 11 and circular recess base plate portion 12 form a recess 36.

Figure 4A:
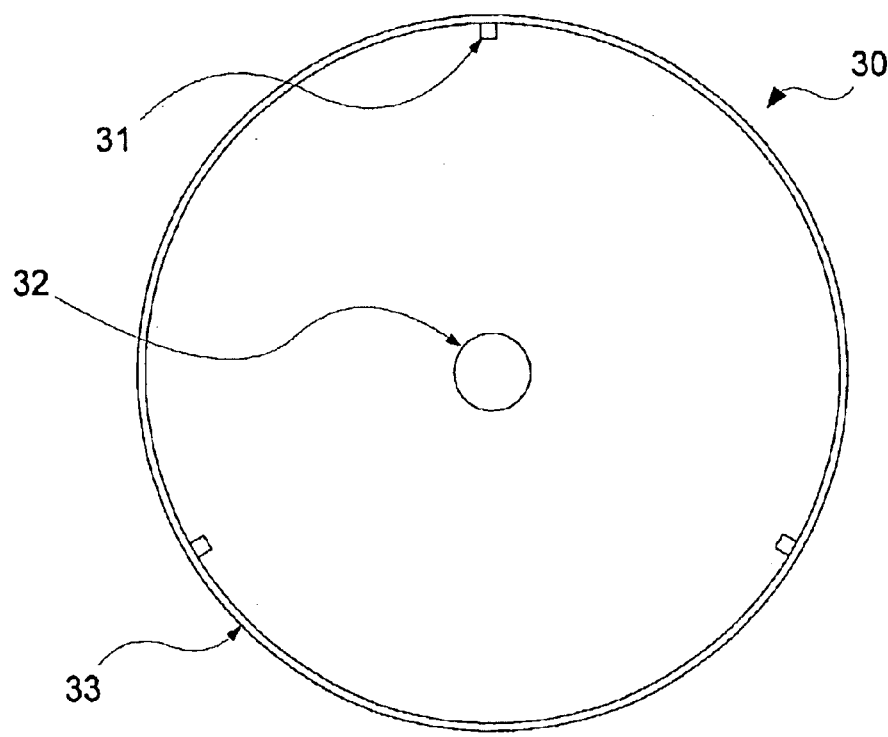
FIGS. 4A and 4B are side and top views of the protective cover member.
Figure 4B:
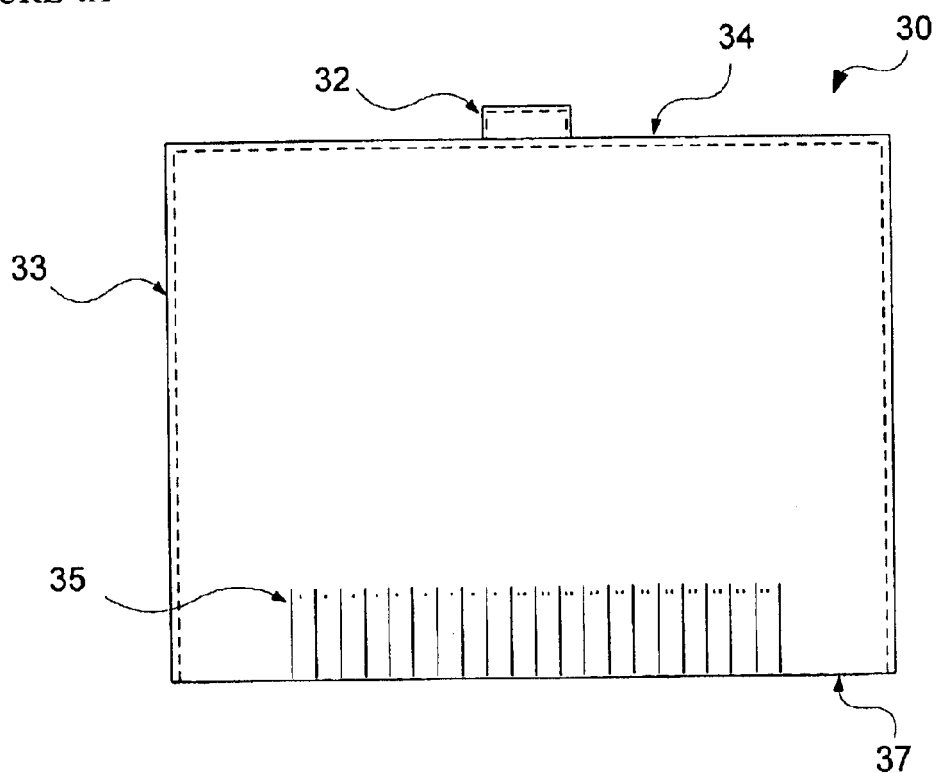

As shown in FIGS. 4A and 4B, the cover member 30 comprises a thin-walled cylinder 33, a thin flat top 34 that is deformed in the center to form a hub 32, a plurality of disc lifting tabs 31 and a set of rotation index markings 35. The diameter of the cover member 30 is greater than the diameter of the modified disc medium 20 such that the cover member may be placed over a stack 21 of modified disc media 20 yet less than the diameter of the lower base plate portion 16 such that the cover member 30 may rest on the upper surface 19 of the lower base plate portion 16. The height of the protective cover member 30 is such that the stacking column cap 17 seats in the cover member hub 32 when the bottom rim of the cover member 30 is resting on the lower base plate portion 16. The inner diameter of the hub 32 is slightly larger that that of the stacking column cap 17 such that the cover member 30 may be freely rotated while resting on the lower base plate portion 16. The rotation index markings 35 are spaced uniformly around the lower edge 37 of the cylinder 33 of the cover member 30 and span the range of disc medium indexing angles 26 for all modified disc media 20A, 20B, 20C, etc. in the stack 21. The rotation index markings are spaced at the disk increment angle as discussed above.

The disc lift mechanisms are disc lifting tabs 31, thin rectangular tabs spaced uniformly around the lower edge 37 of the cover member 30 and extend radially inward. The number of disc lifting tabs 31 is the same as the number of outer disc notches 22. Their length and width is such that they fit into the outer disc notches 22 of a modified disc medium 20.

Figure 5A:
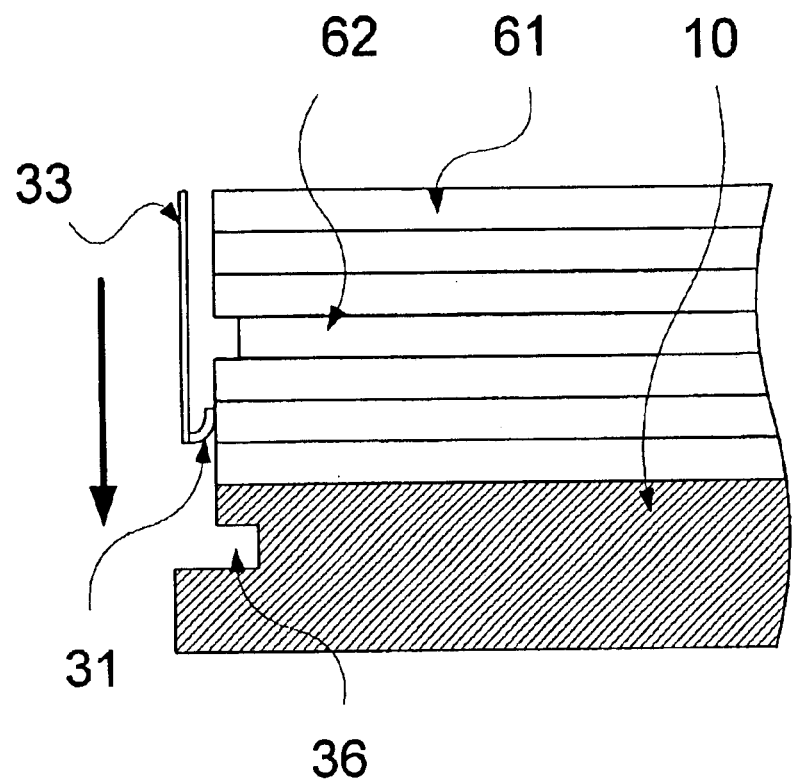
FIGS. 5A, 5B, 5C, 5D and 5E are sectional views that illustrate the operation of a disc lifting mechanism.
Figure 5B:
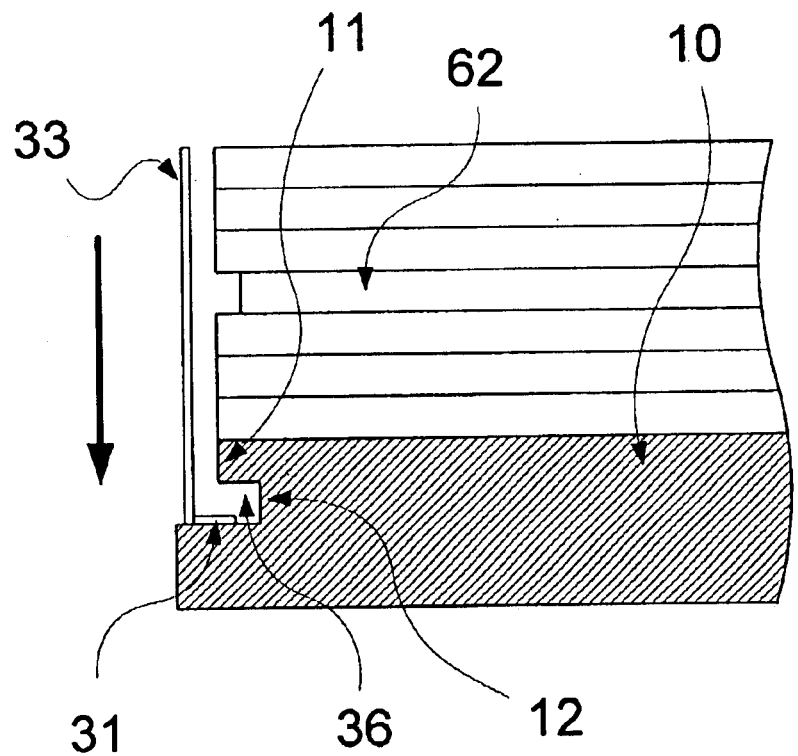
Figure 5C:
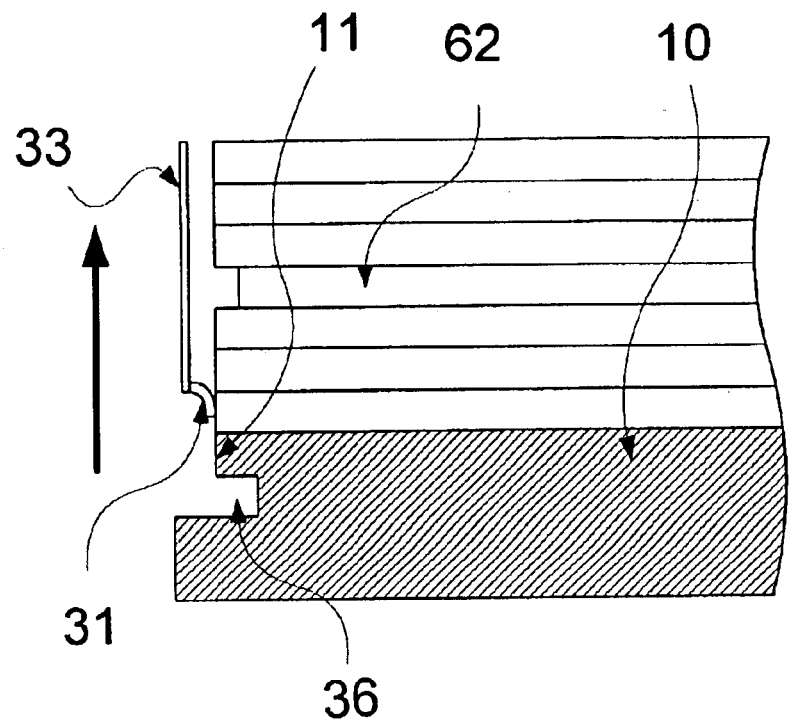
Figure 5D:
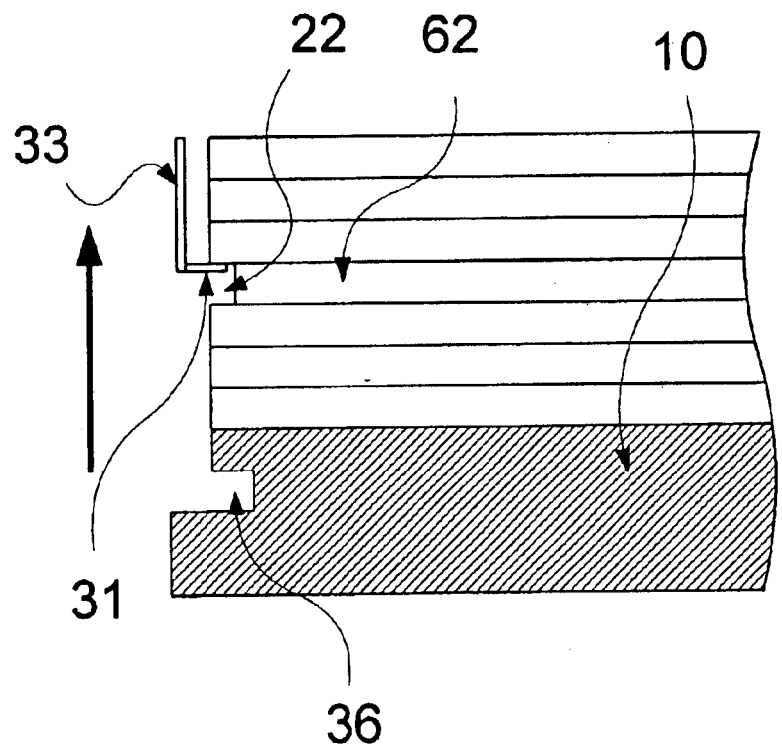
Figure 5E:
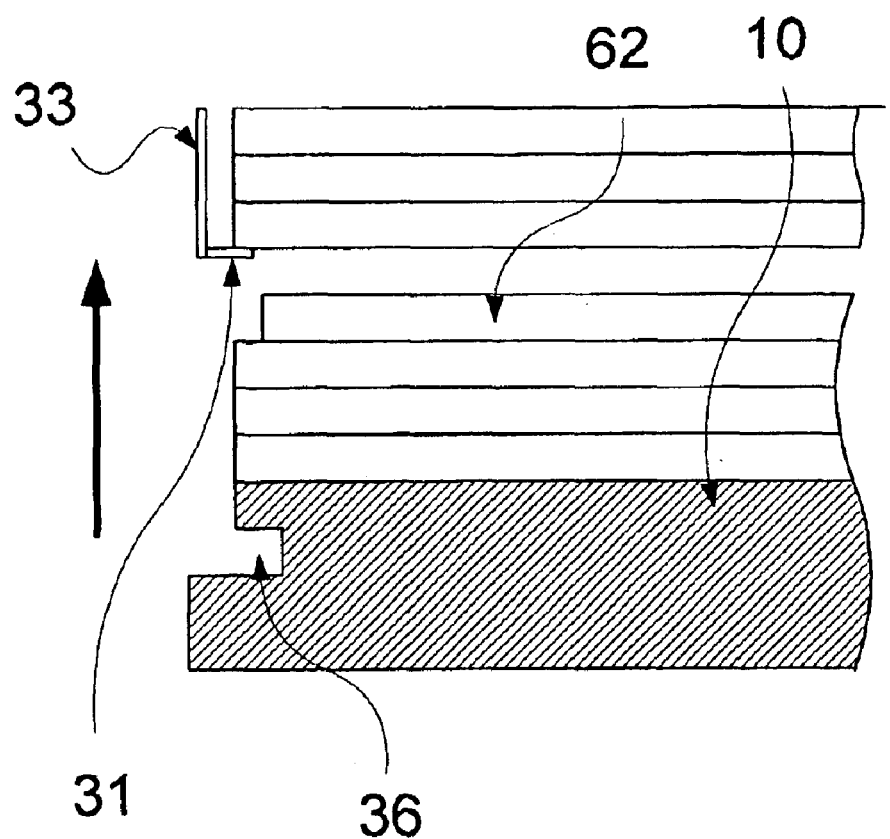

As shown in FIGS. 5A through 5E, to retrieve a particular disc of interest 62 from the stack 21, the user first ensures that the cover member 30 is pushed fully onto the stack. As the cover member 30 is pushed onto the stack, contact with the first topmost modified disc medium 61 deflects the disc lifting tabs 31 upwards, as shown in FIG. 5A. Once the cover member 30 is pushed fully onto the stack 21 the disc lifting tabs 31 relax into the recess 36 provided by the base plate recess portion 12, as shown in FIG. 5B. The user then selects a particular disc 62 for retrieval by rotating the cover member 30 relative to the stack 21 until one of the base plate rotation reference marks 15 lines up with the appropriate rotation index mark within the set of rotation index markings 35. The user then raises the cover member 30 without further rotation relative to the disc stack 21. Initially, contact with the upper base plate portion 11 deflects the disc lifting tabs 31 downwards, as shown in FIG. 5C. The user continues to pull the cover member 30 upwards until the disc lifting tabs 31 encounter the outer disc notches 22 of the disc of interest 62. The disc lifting tabs 31 then relax into the outer disc notches 22, as shown in FIG. 5D. As the user pulls the cover member 30 further the portion of the disc stack 21 above the disc of interest 62 is lifted up with the cover member 30. Once the cover member 30 is clear of the stacking column and base plate member 10 the user may retrieve the disc of interest 62 from the top of the remaining disc stack 21 and may then return the cover member 30 and the remaining portion of the disc stack 21 to the stacking column and base plate member 10.

The strength of the disc lifting tabs 31 should be such that the plurality of disc lifting tabs 31 may support the weight of all modified disc media in the stack 21 yet will deflect when the cover member 30 is either pushed downwards onto a disc stack 21 or pulled upwards off of a disc stack 21.

When the user returns the disc of interest 62 to the stack it does not have to be returned to its original order in the stack 21. This is because retrieval is based only on the disc medium indexing angle 26 and not on the disc's position within the stack 21.

Figure 7:
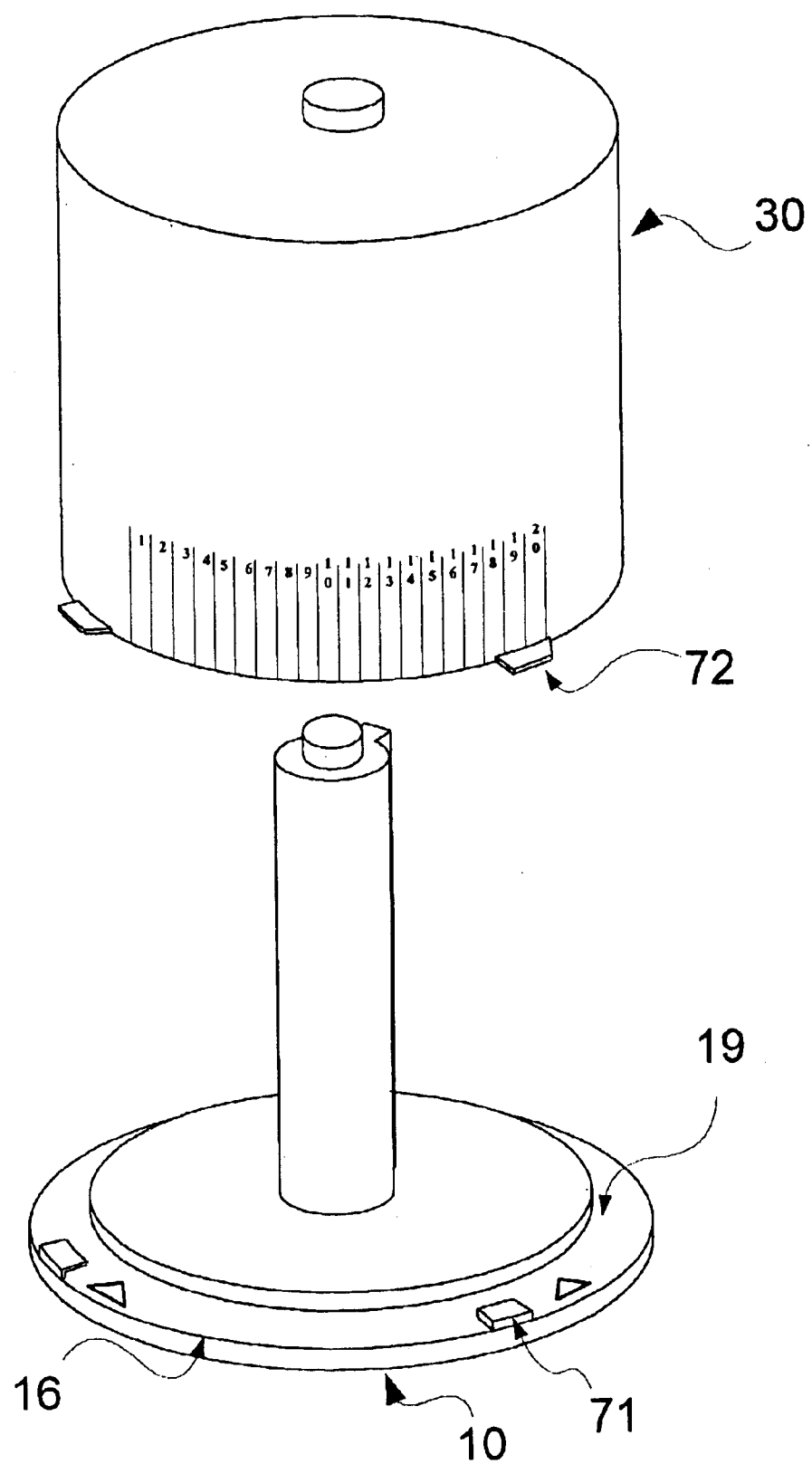
FIG. 7 is a perspective view showing an example of a cover locking mechanism.

In another embodiment, as shown in FIG. 7, the protective cover member 30 and the stacking column and base plate member 10 include a cover locking mechanism which secures the protective cover member 30 to the stacking column and base plate member 10 without impairing disc indexing or the function of the disc lifting tabs 31. The cover locking mechanism may comprise a plurality, equal to the number of outer disc notches 22, of uniformly spaced raised slots 71 protruding from the upper surface 19 of the lower base plate portion 16 and a plurality, equal to the number of raised slots 71, of uniformly spaced locking tabs 72 protruding horizontally outward from the lower edge of the protective cover member 30. The dimensions of the locking tabs 72 are such that they may slide into the raised slots 71 when the cover 30 is rotated. In a preferred embodiment, the locking tabs 72 and the raised slots 71 form an interference fit. In another embodiment, the raised slots 71 are blocked on one side so that the locking tabs 72 may only engage the raised slots by rotation of the protective cover member 30 in one direction and to prevent further rotation once the raised slots 71 are engaged. For such an embodiment, disc indexing angles 26 are restricted to those angles that do not occur when the cover locking mechanism is engaged.

Figure 6A:
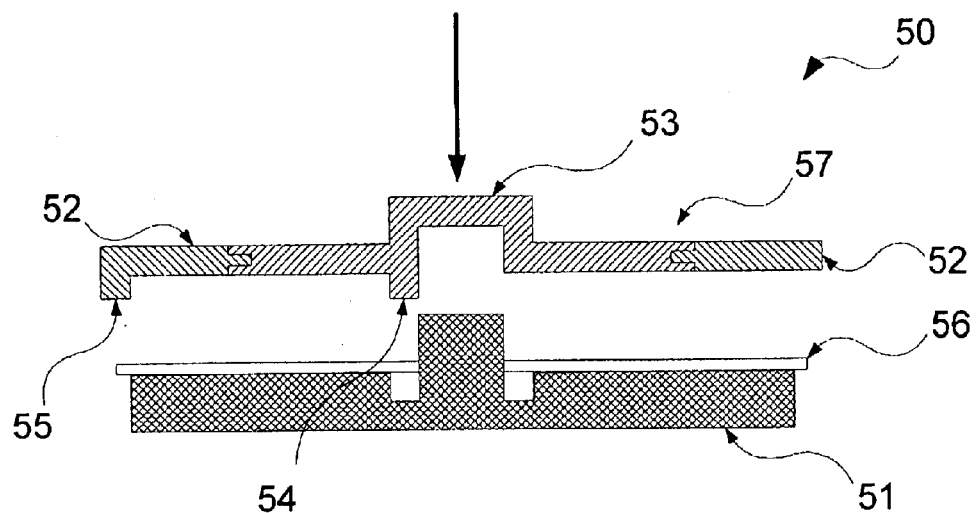
FIGS. 6A and 6B are sectional views that illustrate the operation of a disc notching tool to prepare discs for storage in the system.
Figure 6B:
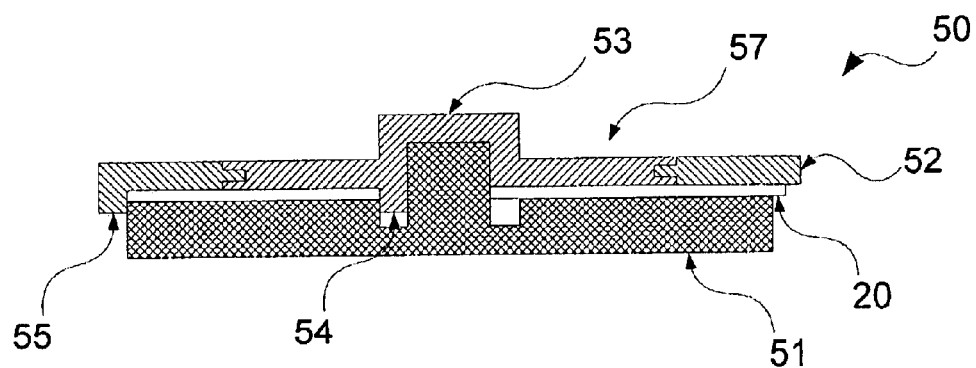

As shown in FIGS. 6A and 6B, a disc notching tool 50 may consist of a circular lower supporting plate 51 and a circular upper disc cutting plate 57. The upper disc cutting plate consists of a central hub 53 and a rotating outer ring 52. An alignment notch punch 54 is attached to the center hub 53 and protrudes downwards. A series of outer disc notch punches 55 are attached to the outer ring 52 and protrude downwards. The outer ring 52 may be rotated relative to the central hub 53 to set a desired disc indexing angle. A disc medium 56 is placed on the lower supporting plate 51 and then the upper disc cutting plate 57 is placed over the lower supporting plate 51 and pushed down with sufficient force to cut the notches.

While preferred embodiments of the present invention are shown and described, it is envisioned that those skilled in the art may devise various modifications of the present invention without departing from the spirit and scope of the appended claims.

What is claimed is:

1. A system for the storage and retrieval of disc media, comprising:

a plurality of discs, each of said discs having a chucking hole, said chucking hole having a cross-section, a base plate member, a stacking column projecting from said base plate member and having a cross-section corresponding to the cross-section of said chucking hole, whereby said discs can be chucked onto said stacking column, means to rotationally align said discs on said stacking column, means to selectively retrieve a desired one of said discs.

2. A system according to claim 1 where said means to retrieve comprises a lifting device formed on a protective cover member removably attached to said stacking column.

3. The system according to claim 1, wherein said discs have a plurality of outer disc notches extending radially inward from the outer edges of said discs, wherein the angular positions of said outer disc notches relative to a fixed point on said stacking column are unique for each of said discs, and said means to retrieve comprises a plurality of disk lift mechanisms, equal in number to the number of outer disc notches, rotatable around said base plate member and spaced such that each of said disk lift mechanisms aligns with a said outer disc notch of a unique one of said discs when said disks lift mechanisms are rotated to said angular position of said unique one of said discs.

4. The system according to claim 3, wherein said means to align said discs chucked onto said stacking column constrains each of said discs to one of a set of uniformly-spaced rotational orientations, the number of said uniformly-spaced rotational orientations being equal to said number of outer disc notches.

5. The system according to claim 4, wherein said discs have a recordable surface having a maximum diameter and said outer disc notches extend inward no further than said maximum diameter of said recordable surface.

6. The system according to claim 4, wherein said disc lift mechanisms are attached to a protective cover member removably attached to said stacking column.

7. The system according to claim 4, wherein said discs contain at least one disc alignment notch protruding radially outward from said chucking hole and said means to align comprises at least one stacking column alignment notch, equal in number to the number of said at least one disc alignment notch, protruding radially outwards from said stacking column, whereby said at least one stacking column alignment notch aligns with said least one disc alignment notch to constrain said discs chucked onto said stacking column at one of said uniformly-spaced rotational orientations and prevent rotation of said discs about said stacking column.

8. The system according to claim 7, wherein said discs have a recordable surface and said at least one stacking column alignment notch and said at least one disc alignment notch are oriented so that said plurality of discs can be chucked on said stacking column only with said recordable surface facing said base plate member.

9. The system according to claim 4, wherein said discs contain at least one disc alignment notch protruding radially inward from said chucking hole and said means to align comprises at least one stacking-column notch, equal in number to the number of said at least one disc alignment notch, protruding radially inward from said stacking column, whereby said at least one stacking column alignment notch aligns with said at least one disc alignment notch to constrain said discs chucked onto said stacking column at one of said uniformly-spaced rotational orientations and prevent rotation of said discs about said stacking column.

10. The system according to claim 9, wherein said discs have a recordable surface and said at least one stacking column alignment notch and said at least one disc alignment notch are oriented so that said plurality of discs can be chucked on said stacking column only with said recordable surface facing said base plate member.

11. The system according to claim 4, wherein said disc lift mechanisms comprises
a plurality of flexible tabs protruding radially inward from the bottom edge of a protective cover member removably attached to said stacking column, and wherein said base plate member comprises
an upper base plate portion having a diameter substantially the same as said maximum diameter of said discs,
a recess base plate portion having a diameter substantially the same as the diameter formed by said outer disc notches and a thickness substantially the same as the thickness of said discs, and
a lower base plate portion with a diameter greater than the diameter of said protective cover member.

12. The system according to claim 11, wherein the cross-section of said flexible tabs corresponds to cross-section of said outer disc notches so that said flexible tabs fit into said outer disc notches.

13. The system according to claim 4, wherein said means to retrieve further comprises a plurality of rotation index markings appearing on the outer surface of a protective cover member removably attached to said stacking column, each of said rotation index markings corresponding to a unique one of said plurality of discs, and
a plurality of base plate rotation reference marks, equal in number to the number of outer disc notches, whereby rotation of said protective cover member so that one of said plurality of base plate rotation reference marks substantially aligns with one of said plurality of rotation index markings corresponding to said disc of interest, aligns said disc lift mechanisms with said outer disc notches of said disc of interest.

14. The system according to claim 4, wherein the stacking column is tapered at the end to allow easier chucking of discs.

15. The system according to claim 4, further comprising means for securing said protective cover member to said base plate member.

16. The system according to claim 4, further comprising a cover locking mechanism, comprising:
a plurality of raised slots, protruding from said lower base plate,
a plurality of locking tabs, equal in number to the number of said raised slots, protruding from said protective cover member, whereby said locking tabs engage said raised slots when said protective cover member is rotated, thereby securing said protective cover member to said lower base plate.

17. The system according to claim 16, wherein said locking tabs form an interference fit with said raised slots.

18. The system according to claim 16, wherein said raised slots engage said locking tabs in only one direction.

19. An apparatus for notching a disc for use in a system for the storage and retrieval of disc media, comprising a central hub, an alignment notch punch protruding from said central hub, an outer ring that rotates about said central hub, and a plurality of outer disc notch punches protruding from said outer ring, wherein said outer ring is rotated to orient said disc notch punches at a desired angle from said alignment notch punch.

20. The apparatus of claim 19, further comprising a supporting plate.

21. A disc media storage and retrieval system, comprising:
a base section containing a plurality of base section rotation marks,
a spindle protruding from said base section and containing a spindle notch,
a cover section removably attached to said notched spindle and rotatable about said spindle, containing a plurality of cover section rotation marks and
a plurality of disc lifting tabs, wherein the number of said plurality of disc lifting tabs is the same as the number of said base section rotation marks, and a stack comprising a plurality of disc media, each one of said disc media containing
  a chucking hole having a cross-section substantially the same as the cross-section of said spindle,
  an alignment notch having a cross-section substantially the same as the cross-section of said spindle notch, and
  a plurality of outer disc notches, wherein the number of said plurality of outer disc notches is the same as the number of said plurality of said disc lifting tabs,
wherein each one of said disc media is assigned a unique index angle comprising the angle between said alignment notch and the first of said plurality of outer disc notches, and
wherein said cover section rotation marks are indexed to correspond to said unique index angle for each one of said disc media, and
wherein rotation of said cover section to align one of said cover section rotation marks to one of said base section rotation marks aligns said plurality of disc lifting tabs with said outer disc notches for said disc having said unique index angle corresponding to said one of said base section rotation marks,
whereby removing said cover section axially to said spindle exposes said corresponding one of said disc media.

\* \* \* \* \*